United States Patent Office 3,312,303
Patented Apr. 4, 1967

3,312,303
TILTING VEHICLE CAB
James Milloy, 164 Fox Lane, Leyland, England
Filed Mar. 29, 1965, Ser. No. 443,195
Claims priority, application Great Britain, Apr. 17, 1964, 16,070/64
5 Claims. (Cl. 180—89)

The invention relates to the mounting of a tilting cab for a motor lorry or like vehicle, and is concerned with mechanism for counterbalancing the cab.

It is the usual practice to mount a tilting cab to pivot about the axis close to or coinciding with that of a transverse torsion bar clamped at one end to the chassis of the vehicle and directly secured to cab at the other end. The bar is torqued so as to somewhat more than counterbalance the weight of the cab. Some suitable holding down latch at the rear of the cab secures it to the chassis in its normal position. In such a mechanism the whole of the torque of the counterbalance is locked up in the cab which is thus subjected to substantial stress.

In accordance with the invention this undesirable stressing of the cab structure is avoided by the use of separate tilt beam, pivotally mounted to the chassis frame at the front and coupled to the cab structure at the rear, to transmit the tilting torque from the torsion bar or other generator of tilting torque. When the cab is to be held in its normal "down" position it is the rear end of the tilt beam which is locked to the chassis frame so that the torque is distributed to the chassis frame and does not stress the cab at all.

In order that the invention may be more fully understood a motor vehicle cab with tilt mechanism in accordance with it will be described in some detail, by way of example, with reference to the accompanying drawings in which.

Figure 1:
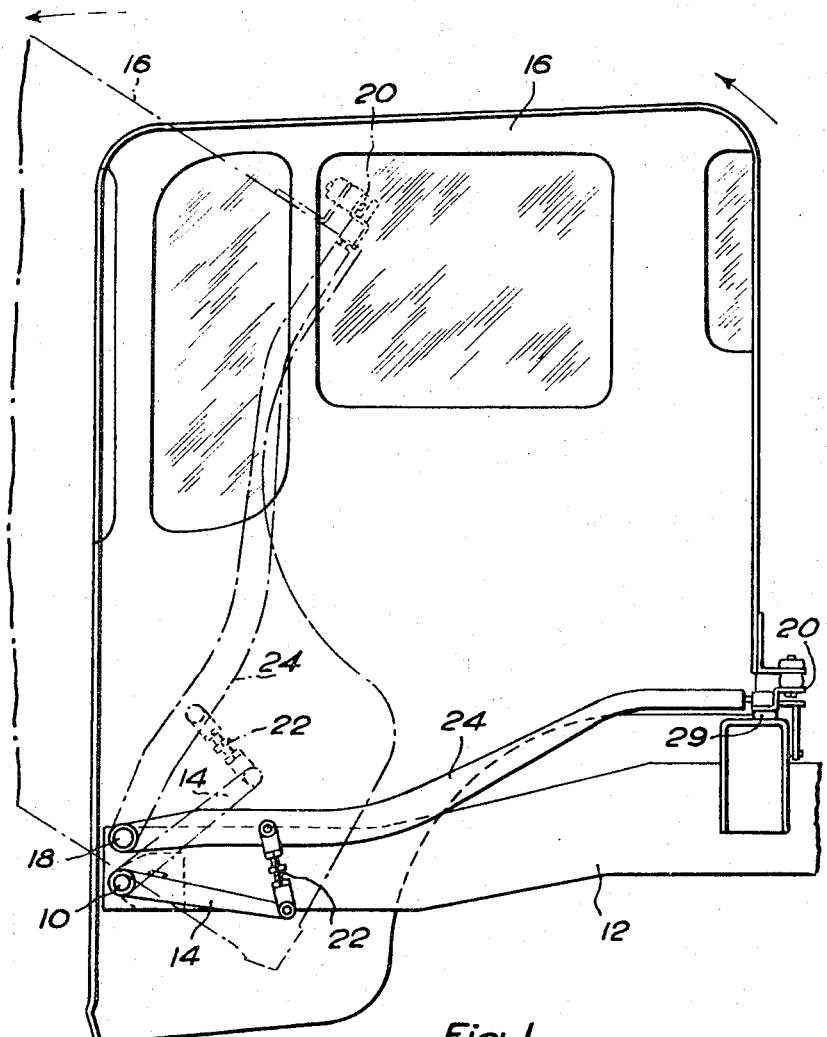
FIGURE 1 is a side elevation showing the cab in its normal down position and, fragmentarily in broken lines, in a tilted position.
Figure 2:
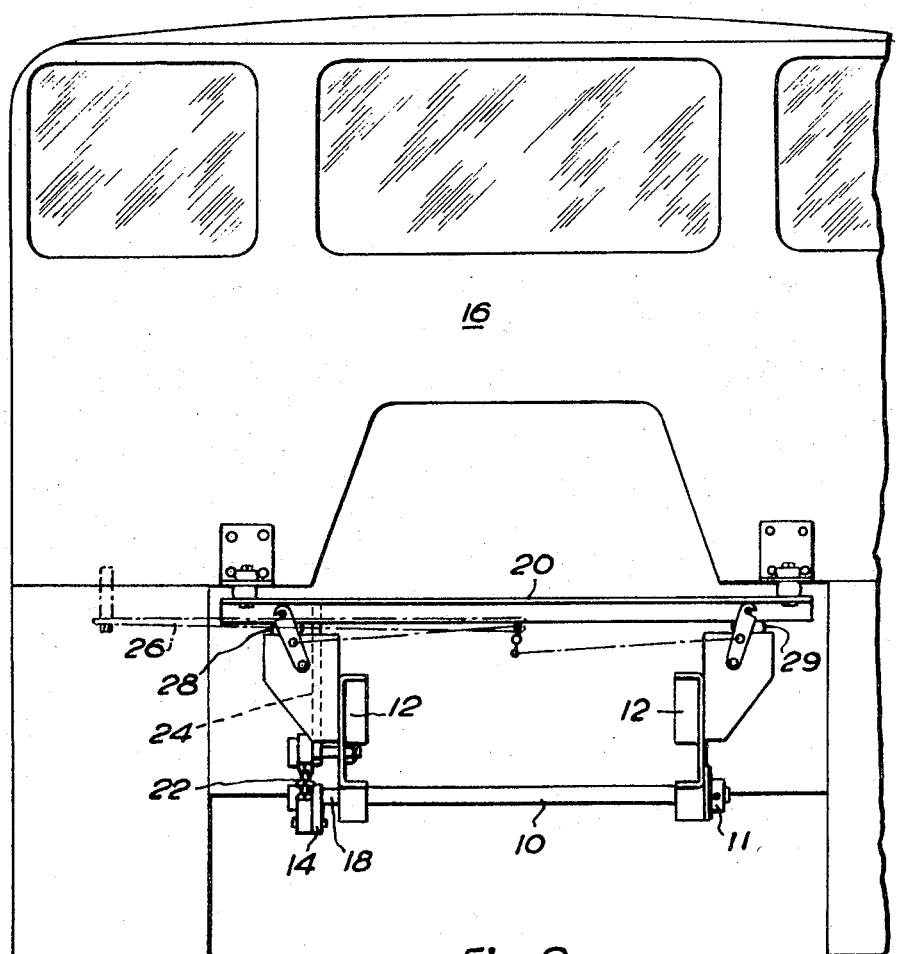
FIGURE 2 is a partial rear elevation of the cab.
Figure 3:
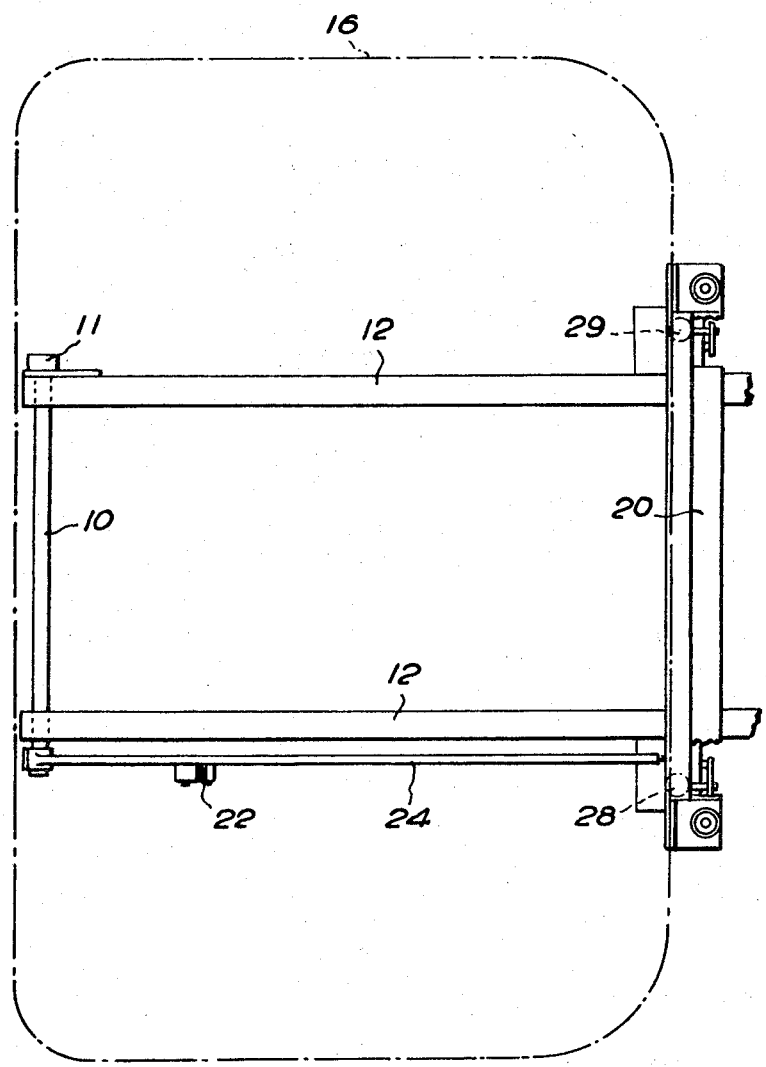
FIGURE 3 is a plan view of the tilt mechanism.

In the mechanism shown in the drawings a transverse torsion bar 10 is rigidly secured at one end to the chassis frame 12 at 11 (see FIGURES 2 and 3) and carries a torque reaction arm 14 at the other free end. The cab 16 is mounted to tilt forward about the axis of a pivot pin 18 immediately above that of the torsion bar and its mounting includes a transverse mounting member 20 at the rear.

The torque reaction arm is coupled by a link 22 of adjustable length to a tilt beam 24, pivotally mounted on the chassis frame at 18 to tilt about the same axis as the cab, and attached at its rear end to the cab rear mounting member.

Mechanism (indicated diagrammatically at 26) is provided for securing the cab rear mounting member against mounting blocks 28, 29 on the chassis frame to hold the cab in the normal "down" position. The torque of the torsion bar is thus distributed directly onto the chassis frame without stressing the cab itself at all.

I claim:

1. Mechanism for mounting a forwardly pivoting cab on a motor vehicle comprising a transverse torsion bar adapted to be secured at one end to the chassis frame of said vehicle; a tilt beam separated from said cab, pivotally mounted on said chassis frame at the front thereof and coupled to the cab structure at the rear thereof; means coupling said tilt beam to the other free end of said torsion bar, whereby tilting torque is transmitted from said bar to the structure of said cab at the rear thereof; and locking mechanism adapted to hold said cab in a normal "down" position by locking the rear end of said tilt beam to said chassis frame.

2. Mechanism according to claim 1, wherein a transverse mounting member is provided on the rear of said cab structure and is attached to said tilt beam at the rear thereof, said transverse mounting member being secured against mounting blocks on said chassis frame when said cab is locked in the "down" position.

3. Mechanism according to claim 1, in which the means includes a torque reaction arm carried on said free end of said torsion bar; and a link of adjustable length whereby said reaction arm is coupled to said tilt beam.

4. Mechanism for mounting a forwardly pivoting cab on a motor vehicle comprising a torque generator means; a tilt beam separate from said cab, pivotally mounted on the chassis frame of said vehicle at the front thereof and coupled to the cab structure at the rear thereof; means coupling said tilt beam to said torque generator means, whereby tilting torque is transmitted from said generator means to the structure of said cab at the rear thereof; and locking mechanism adapted to hold said cab in a normal "down" position by locking the rear end of said tilt beam to said chassis frame.

5. Mechanism for a pivotally mounting cab on a motor vehicle comprising a transverse torsion bar adapted to be secured at one end to a chassis frame of the vehicle; a tilt beam pivotally mounted on the chassis frame at one end of the beam and coupled to the cab; means coupling said tilt beam to the other end of the torsion bar whereby tilting torque is transmitted from said bar to said cab; and locking mechanism adapted to hold said cab in a normal "down" position by locking the other end of said tilt beam to said chassis frame.

References Cited by the Examiner

UNITED STATES PATENTS

| 2,864,121 | 12/1958 | Imber et al. | 180—89 X |
| 2,951,548 | 9/1960 | Crockett et al. | 180—89 |
| 3,184,262 | 5/1965 | Mintz | 180—89 X |

KENNETH H. BETTS, *Primary Examiner.*